(12) United States Patent
Tang

(10) Patent No.: US 9,074,873 B1
(45) Date of Patent: Jul. 7, 2015

(54) MEASUREMENT OF THICKNESS VARIATION AND SHAPE OF WAFERS

(71) Applicant: KLA-Tencor Corporation, Milpitas, IA (US)

(72) Inventor: Shouhong Tang, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 164 days.

(21) Appl. No.: 13/756,187

(22) Filed: Jan. 31, 2013

(51) Int. Cl.
*G01B 11/02* (2006.01)
*G01B 11/06* (2006.01)

(52) U.S. Cl.
CPC .................................... *G01B 11/06* (2013.01)

(58) Field of Classification Search
CPC ........... G01B 11/0625; G01B 2290/70; G01B 9/02021; G01B 9/02027; G01B 2290/45; G01B 9/02072; G01B 11/02; G01B 2290/25; G01B 9/02; G01B 11/161; G01B 11/272; G01B 11/27; G01B 11/00; G01B 11/14; G01B 11/002; G03F 9/70; G03F 9/7088; G03F 9/7076; G03F 9/7084; G03F 9/7003; G03F 9/7065; G03F 7/70258; G03F 9/7023; G03F 9/708; G03F 9/7015; H01L 21/681; H01L 23/544; H01L 21/67259; G01N 21/956; G01N 21/9501; H05K 1/0269; H05K 1/0274
USPC ......... 356/496, 503, 630, 511, 485, 450, 400, 356/401, 153, 622, 620, 152.3, 445, 490; 250/548, 492.2, 492.22; 382/151, 144, 382/145
See application file for complete search history.

(56) References Cited

U.S. PATENT DOCUMENTS

| | | | |
|---|---|---|---|
| 6,100,987 A * | 8/2000 | Kawakubo | 356/401 |
| 6,319,638 B1 * | 11/2001 | Inomoto | 430/5 |
| 6,847,458 B2 | 1/2005 | Freischlad et al. | |
| 2007/0266875 A1 * | 11/2007 | Berge | 101/481 |
| 2010/0208272 A1 * | 8/2010 | Tang et al. | 356/503 |

* cited by examiner

*Primary Examiner* — Tarifur Chowdhury
*Assistant Examiner* — Mohamed Amara
(74) *Attorney, Agent, or Firm* — Suirer Swantz pc llo

(57) ABSTRACT

The present disclosure is directed to a system for measuring a thickness variation and a shape of a wafer. The system includes a first reference flat and a second reference flat. The first reference flat and the second reference flat are spaced apart to form a cavity. The cavity is configured to receive the wafer. The system also includes a plate. The plate may be inserted into the cavity with the wafer. The system also includes a first interferometer located on a first side of the cavity and a second interferometer located on a second side of the cavity. The system also includes a processor which may be in communication with the first interferometer and the second interferometer. The processor is configured to determine the thickness variation and the shape of the wafer based on at least the readings of the first interferometer and the second interferometer.

20 Claims, 4 Drawing Sheets

MEASUREMENT OF THICKNESS VARIATION AND SHAPE OF WAFERS

TECHNICAL FIELD

The disclosure generally relates to inspection systems, and more particularly to a system and method for measuring the thickness variation and shape of a wafer.

BACKGROUND

Existing systems and methods for measuring the thickness variation and shape of a wafer may not provide a desired level of accuracy and sensitivity to meet the demands of the next generation of semiconductors. As semiconductor technology advances, so do the wafer sizes and patterns on wafer surfaces, resulting in a need for improved systems with greater accuracy.

One existing method for determining the thickness variation and shape of a wafer may involve obtaining a distance map between each side of the wafer and two corresponding reference flats. The existing systems and methods may compute the thickness variation and shape of the wafer from this data by comparing it to calibrated distance maps between the two reference flats and each side of the wafer. Two maps, one corresponding to each side of the wafer, may be combined to compute the thickness variation and the shape of the wafer. This process may not provide a desired level of accuracy and sensitivity to meet requirements for systems measuring the thickness variation and shape of a wafer.

Therefore, there exists a need for a method and apparatus for measuring the thickness variation and shape of a wafer.

SUMMARY

The present disclosure involves the insertion of a plate into a cavity of a system for measuring a thickness variation and a shape of a wafer. The inclusion of the plate in the cavity may increase the amount of non-circular shaped boundary. The plate is positioned within a cavity that is formed by a first reference flat and a second reference flat. The first reference flat and the second reference flat are spaced apart to form the cavity. The cavity is configured to receive both the plate and the wafer. The system also includes a first interferometer located on a first side of the cavity and a second interferometer located on a second side of the cavity. A processor which may be in communication with the first interferometer and the second interferometer is also included in the system. The processor is configured to determine the thickness variation and the shape of the wafer based on at least the readings of the first interferometer and the second interferometer.

The present disclosure is also directed to a method which may be used to measure the thickness variation and a shape of a wafer. The method may include the step of mapping a distance between a first side of the wafer and a first reference flat and a second side of the wafer and a second reference flat while a plate is inserted in a cavity formed by the reference flats. The method also includes the step of registering a boundary of the wafer and a boundary of the plate. A further step of the method includes computing a thickness variation and a shape of the wafer.

The present disclosure is also directed to a plurality of plates that may be inserted into a cavity of a system for measuring a thickness variation and a shape of a wafer. The inclusion of the plates in the cavity may increase the amount of non-circular shaped boundary. The plates are positioned within a cavity that is formed by a first reference flat and a second reference flat. The first reference flat and the second reference flat may be spaced apart to form the cavity. The cavity is configured to receive the wafer and the plates. The system also includes a first interferometer located on a first side of the cavity and a second interferometer located on a second side of the cavity where the plates and the wafer are located. The first interferometer and the second interferometer are configured to map a distance between a first side of the wafer and the first reference flat and a second side of the wafer and the second reference flat. The system also includes a processor. The processor is communicatively coupled to the first interferometer and the second interferometer and configured to determine the thickness variation and the shape of the wafer based on the mapped distances.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

The present disclosure involves the insertion of a plate into a cavity of a system for measuring a thickness variation and a shape of a wafer. The inclusion of the plate in the cavity may increase the amount of non-circular shaped boundary. The inclusion of the plate as part of an existing inspection system may have the advantage of improving the accuracy and precision of measurements of the wafer thickness variation. Similarly, the inclusion of the plate or plurality of plates in the cavity may improve the accuracy of the metrics derived from the phase maps of the wafer. The improvement of accuracy in measurement of the thickness variation and shape of the wafer may be helpful in meeting the demands for the next generation of the semiconductor industry.

Figure 1:
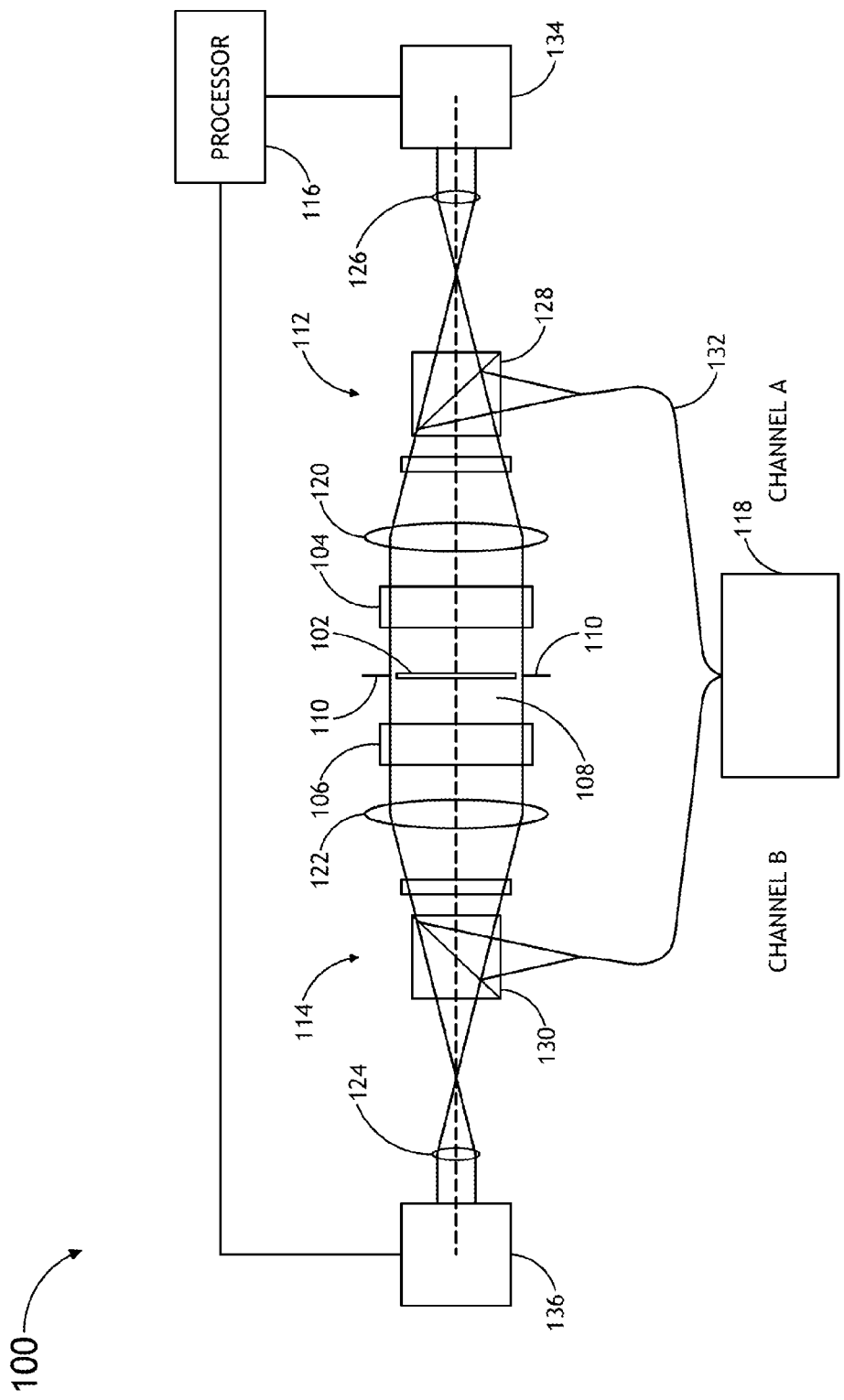
FIG. 1 is a diagrammatic representation of a system for measuring a thickness variation and a shape of a wafer.

Reference will now be made in detail to the subject matter disclosed, which is illustrated in the accompanying drawings. Referring generally to FIG. 1, a system 100 for measuring a thickness variation and a shape of a wafer 102 is provided. The system 100 includes a plate 110 which may be inserted into a cavity 108 of the system along with a wafer 102. The plate 110 of the system 100 shown in FIG. 1 may include a single plate 110 or a plurality of plates 110. The plate 110 of the system 100 shown in FIG. 1 may be configured to increase a non-circular shape boundary of the cavity 108. The insertion of the plate 110 into the cavity 108 of the system 100 may increase the non-circular shape boundary recorded by the first interferometer 112 and the second interferometer 114 in the cavity 108 area. This increase in the non-circular shape boundary may help to increase the registration sensitivity and precision of measurements of the size and thickness of the wafer 102.

The system 100 also includes a first reference flat 104 and a second reference flat 106 spaced apart to form a cavity 108. The cavity 108 is configured to receive the wafer 102 and the plate 110. The system 100 also includes a first interferometer 112 located on a first side of the cavity 108 and a second interferometer 114 located on a second side of the cavity 108. The system 100 also includes a processor 116 which may be in communication with the first interferometer 112 and the second interferometer 114. The processor is configured to determine the thickness variation and the shape of the wafer based on the readings of the first interferometer 112 and the second interferometer 114.

The system 100 shown in FIG. 1 may include additional elements. For example, the system 100 may include an illumination source 118. The system 100 may further include a first collimator 120 and a second collimator 122, as well as a first relay 124 and a second relay 126. The system 100 may also include a first polarization beam splitter 128 and a second polarization beam splitter 130, fibers 132, and a first camera 134 and a second camera 136. The system 100 operates similar to the system and methods described in related U.S. Pat. No. 6,847,458 B2, which is hereby incorporated by reference in its entirety.

Figure 2A:
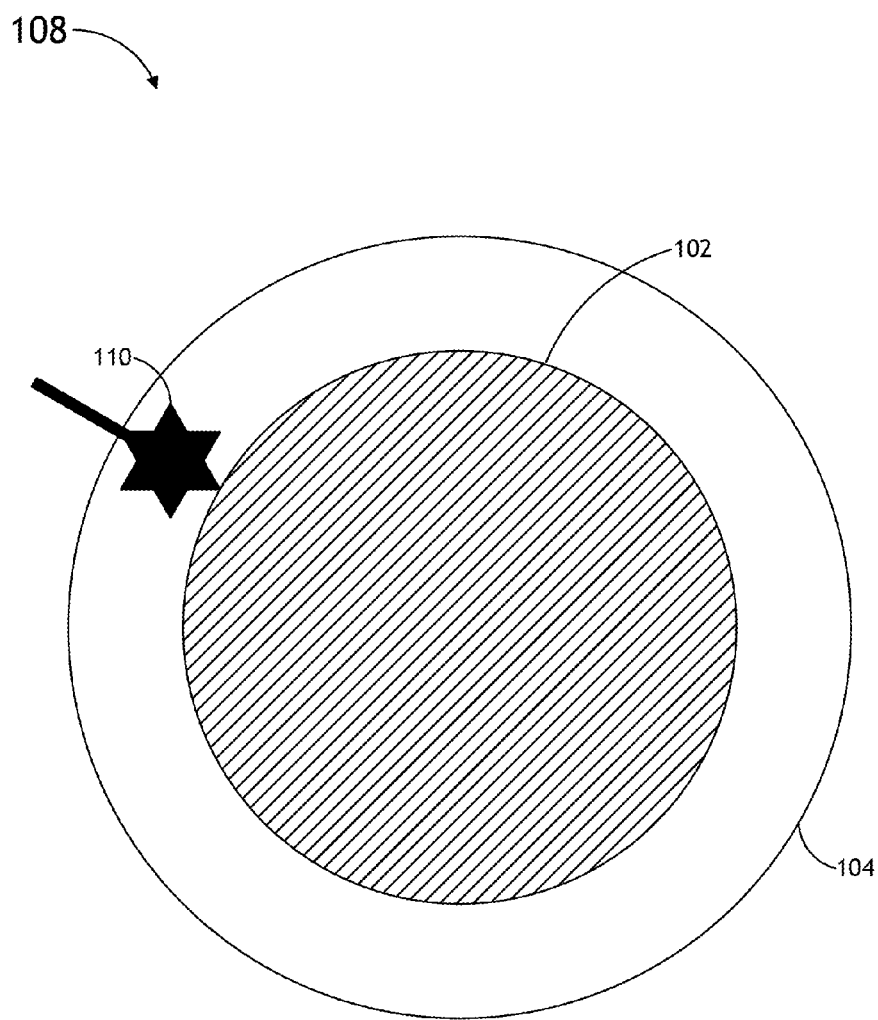
FIG. 2A is a diagrammatic representation of a plate and a wafer of the system shown in FIG. 1.

Referring generally to FIG. 2A, an example diagrammatic representation of the plate 110 and the wafer 102 of the system 100 shown in FIG. 1 is provided. Specifically, FIG. 2A shows wafer 102 with plate 110 in the cavity 108 formed by the first reference flat 104 and the second reference flat (not shown in FIG. 2A). As shown in FIG. 2A, the inclusion of the plate 110 in the cavity 108 increases the amount of non-circular shaped boundary.

In one embodiment, the plate 110 may be positioned generally on the same plane as the wafer 102. In another embodiment, the plate 110 may be placed on a different plane than the wafer 102 and be disposed closer to either the first reference flat or second reference flat while the wafer 102 may remain generally equidistant from each reference flat. The placement of the plate 110 may vary depending on the system requirements without departing from the scope and intent of the present disclosure.

Figure 2B:
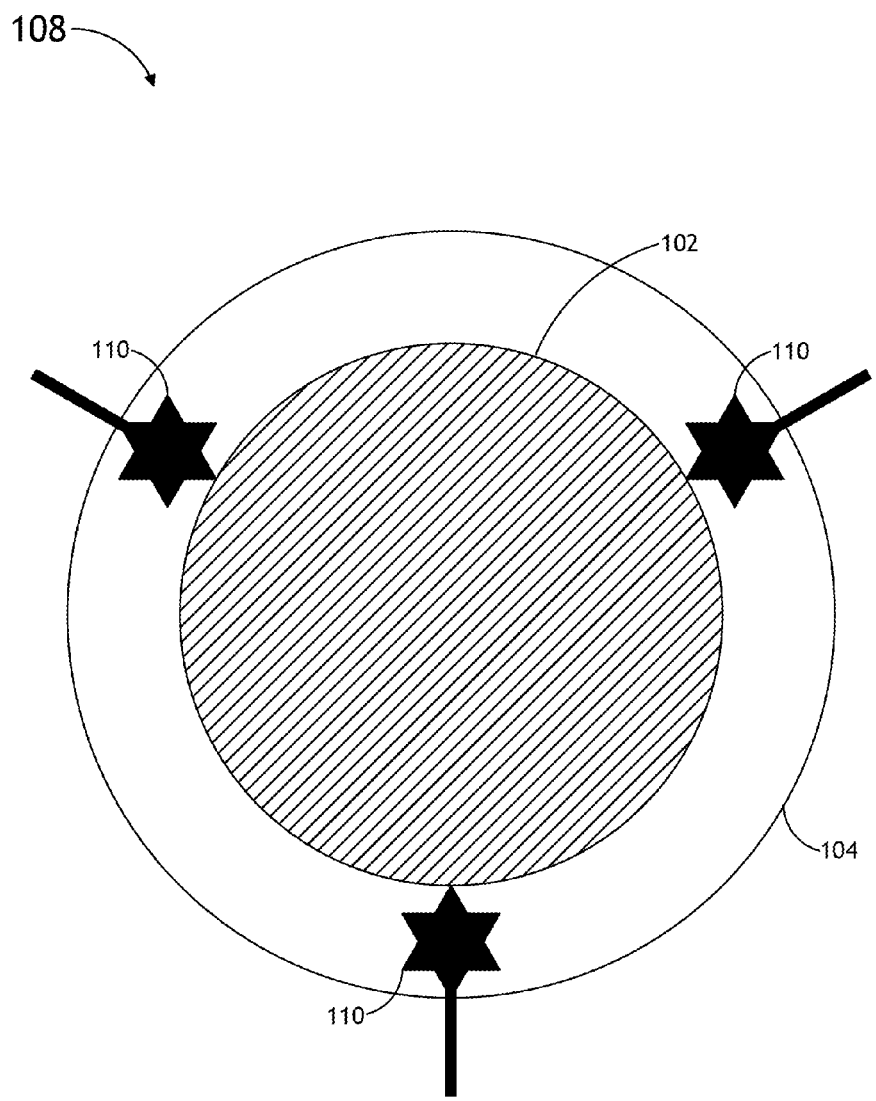
FIG. 2B is a diagrammatic representation of a plurality of plates and a wafer of the system shown in FIG. 1.

Referring generally to FIG. 2B, an example diagrammatic representation of a plurality of plates 110 and the wafer 102 of the system 100 is provided. Specifically, in FIG. 2B there are three plates 110. The inclusion of three plates 110 in the embodiment of FIG. 2B increases the amount of non-circular shaped boundary in the cavity 108.

In the examples shown in FIGS. 2A and 2B, a star shaped plate 110 is depicted, including six points. However, the shape of the plate 110 is merely exemplary and additional plate sizes and shapes may be included depending on the system requirements and configuration. In addition, additional plates 110 may be included in the system 100. The examples described in the present disclosure and merely exemplary and not intended to be limiting.

The first interferometer 112 and the second interferometer 114 shown in FIG. 1 may include Fizeau interferometers in one embodiment. In addition, the placement of the wafer 106 in the cavity 108 between the reference flats and the first interferometer 112 and the second interferometer 114 may include a centered position or an off-center position between the two channels. The first interferometer 112 and the second interferometer 114 may be used to acquire two sets of intensity frames that record interferograms in Channel A (corresponding to the first interferometer 112) and Channel B (corresponding to the second interferometer 114). The interferograms may include different phase shifts by varying the wavelength of the illumination source 118. Using the different intensity frames, it may be possible to exact two phase maps for the wafer 106. The phase maps may then be registered with the shape boundary of the wafer 106 and the boundary of the plate 110 located in the cavity 108. The phase maps can then be used to compute the thickness variation and wafer 106 boundary.

The wafer 106 of the system 100 shown in FIG. 1 may include a patterned wafer in one embodiment or an unpatterned wafer in another embodiment. The wafer 106 may be a silicon wafer in one embodiment.

The processor 116 of the system 100 shown in FIG. 1 may include any suitable computer processor capable of calculating the wafer 106 thickness variation and shape based on the data received from the interferometers and/or other data (such as calibration data, for example). In addition, the processor 116 may include one processor or a plurality of processors. For example, a first processor may be communicatively coupled to the first interferometer and a second processor may be communicatively coupled to the second interferometer.

Figure 3:
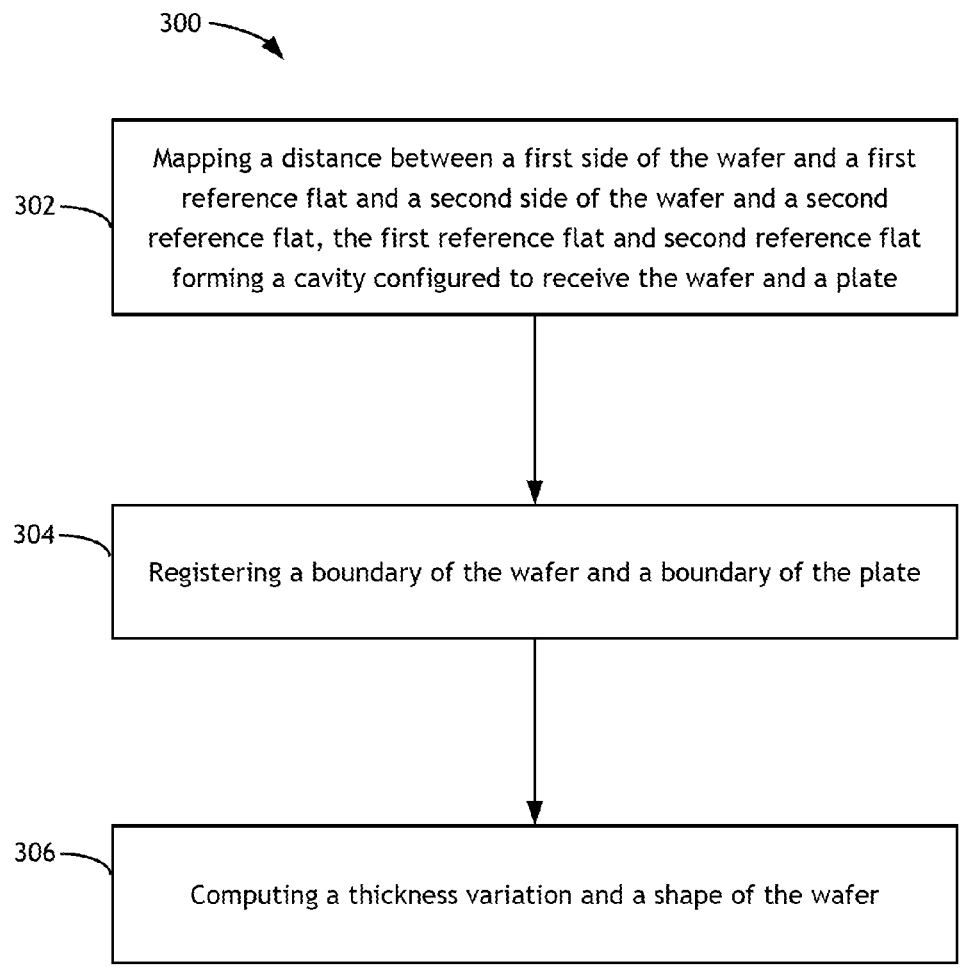
FIG. 3 is a flow diagram of a method for measuring a thickness variation and a shape of a wafer.

The present disclosure is also directed to a method 300 shown in FIG. 3 involving the insertion of a plate into a cavity of a system. The method may be used to measure the thickness variation and a shape of a wafer 300. The inclusion of the plate in the method 300 may help to increase the measurement sensitivity. The method 300 includes the step of mapping a distance between a first side of a wafer and a first reference flat and a second side of the wafer and a second reference flat 302. The first reference flat and second reference flat form a cavity configured to receive the wafer as well as a plate. A further step of the method 300 includes registering a boundary of the wafer and a boundary of the plate 304. The method 300 also includes the step of computing a thickness variation and a shape of the wafer 306.

The method 300 may also include the step of inserting the plate into the cavity formed between the first reference flat and the second reference flat, the cavity configured to receive the wafer. The plate may be removable and inserted each time the method 300 is performed, or may be a permanently included in the cavity. The step of inserting a plate into a cavity formed between a first reference flat and a second reference flat of the method 300 shown in FIG. 3 may include inserting a single plate into the cavity, or a plurality of plates. The inclusion of the plate or a plurality of plates in the cavity may increase the amount of non-circular shaped boundary during the step of mapping a distance between a first side of a wafer and the first reference flat and a second side of the wafer and the second reference flat 304.

The first reference flat and a second reference flat of the method 300 shown in FIG. 3 may be arranged between a first interferometer and a second interferometer. The reference flat may also be a part of the first interferometer and the second reference flat may be part of the second interferometer. In one embodiment, the first interferometer is configured to map the first side of the wafer and the second interferometer is configured to map the second side of the wafer.

The method 300 shown in FIG. 3 may also include a calibration step. For example, the method 300 may include the step of calibrating a phase shifting speed of the first interferometer and the second interferometer. In addition, the method 300 may include the step of calibrating the characteristics of the cavity formed by the first reference flat and the second reference flat. The calibration step may be used to create a cavity phase map, which may be used in determining the thickness variation and shape of the wafer.

The step of mapping a distance between a first side of a wafer and the first reference flat and a second side of the wafer and the second reference flat 304 may include the step of acquiring a first set of intensity frames and a second set of intensity frames. The first set of intensity frames may correspond to a first side of the wafer and the second set of intensity frames may correspond to a second side of the wafer. The first set of intensity frames may be used to exact a first phase map corresponding to the first side of the wafer and the second set of intensity frames may be used to exact a second phase map corresponding to the second side of the wafer. The first phase map and the second phase map may be registered with the wafer boundary and the boundary of the plates recorded in the cavity to yield a thickness variation map of the wafer.

The step of computing a thickness variation and a shape of the wafer from the mapped distances 306 of the method 300 shown in FIG. 3 may include using the first phase map, second phase map, and the cavity phase map obtained during the calibration to compute a thickness variation and a shape of the wafer. For example, by subtracting a sum of the first phase map and the second phase map from the cavity phase map, it may be possible to compute the thickness of the wafer in one embodiment. More specifically, the calculation may be performed by assuming that "A" represents the phase map corresponding to the front reference flat and the front wafer side, and "B" represents the phase map corresponding to the back reference flat and the back wafer side, and "C" represents the phase map corresponding to the cavity formed by the two reference flats. Subtracting the sum of A and B from C may provide the thickness variation as follows:

$$\text{Thickness variation} = C - (A+B).$$

The systems and methods of the present disclosure may provide several advantages. For example, the inclusion of the plate or plurality of plates in the cavity may improve the accuracy and precision of measurements of the wafer thickness variation. Similarly, the inclusion of the plate or plurality of plates in the cavity may improve the accuracy of the metrics derived from the phase maps of the wafer.

It should be recognized that the various steps described throughout the present disclosure may be carried out by a single computing system or, alternatively, a multiple computing system. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

All of the methods described herein may include storing results of one or more steps of the method embodiments in a storage medium. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

It is further contemplated that each of the embodiments of the method described above may include any other step(s) of any other method(s) described herein. In addition, each of the embodiments of the method described above may be performed by any of the systems described herein.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A method for measuring a thickness variation and a shape of a wafer, the method comprising:
    obtaining a first phase map for a first side of the wafer and a second phase map for a second side of the wafer flat when the wafer is placed with a plate in an optical cavity formed along an optical path between a first reference flat and a second reference flat, wherein at least a portion of the plate is recorded with the wafer in the optical cavity;
    registering the first phase map and the second phase map based on a boundary of the wafer and a boundary of the plate; and
    computing a thickness variation and a shape of the wafer.

2. The method of claim 1, further comprising:
    inserting the plate into the optical cavity formed between the first reference flat and the second reference flat.

3. The method of claim 1, wherein the first reference flat is part of a first interferometer and the second reference flat is part of a second interferometer.

4. The method of claim 3, wherein the first interferometer is configured to map the first side of the wafer and the second interferometer is configured to map the second side of the wafer.

5. The method of claim 1, wherein obtaining the first phase map and the second phase map includes:
    acquiring a first set of intensity frames and a second set of intensity frames;
    exacting the first phase map corresponding to the first side of the wafer from the first set of intensity frames and the second phase map corresponding to the second side of the wafer from the second set of intensity frames.

6. The method of claim 5, wherein the computing a thickness variation of the wafer includes:
    subtracting a sum of the first phase map and the second phase map from a optical cavity phase map.

7. The method of claim 1, wherein the wafer is a patterned wafer.

8. The method of claim 1, wherein the wafer is an unpatterned wafer.

9. The method of claim 1, wherein the plate includes a single plate.

10. The method of claim 1, wherein the plate includes a plurality of plates.

11. The method of claim 1, wherein the plate increases a non-circular shape boundary of the optical cavity.

12. A system for measuring a thickness variation and a shape of a wafer, comprising:

a first reference flat and a second reference flat, the first reference flat and the second reference flat spaced apart and form an optical cavity along an optical path between the first reference flat and the second reference, the optical cavity configured to receive the wafer;

a first interferometer located on a first side of the optical cavity and a second interferometer located on a second side of the optical cavity;

a plate, at least a portion of the plate configured to be positioned within the optical cavity and configured to be recordable along with the wafer by the first interferometer and the second interferometer; and a processor, the processor communicatively coupled to the first interferometer and the second interferometer, the processor configured to determine the thickness variation and the shape of the wafer.

13. The system of claim 12, wherein the wafer is a patterned wafer.

14. The system of claim 12, wherein the wafer is an unpatterned wafer.

15. The system of claim 12, wherein the plate includes a single plate.

16. The system of claim 12, wherein the plate includes a plurality of plates.

17. The system of claim 12, wherein the plate is configured to increase a non-circular shape boundary of the optical cavity.

18. A system for measuring a thickness variation and a shape of a wafer, comprising:

a first reference flat and a second reference flat, the first reference flat and the second reference flat spaced apart and form an optical cavity along an optical path between the first reference flat and the second reference, the optical cavity configured to receive the wafer;

at least one plate, at least one portion of the at least one plate configured to be positioned within the optical cavity;

a first interferometer located on a first side of the optical cavity and a second interferometer located on a second side of the optical cavity, the first interferometer and the second interferometer configured to obtain a first set of intensity frames for a first side of the wafer and a second set of intensity frames for a second side of the wafer when the wafer is placed in the optical cavity, wherein the at least one portion of the at least one plate is recorded with the wafer in the optical cavity; and a processor communicatively coupled to the first interferometer and the second interferometer, the processor configured to extract a first phase map based on a first set of intensity frames and a second phase map based on a second set of intensity frames, the processor further configured to register the first phase map and the second phase map based on a boundary of the wafer and a boundary of the plate to determine the thickness variation and the shape of the wafer.

19. The system of claim 18, further comprising:

an illumination source, the illumination source for providing illumination to the first interferometer and the second interferometer, the illumination source configured to provide a plurality of phase shifts.

20. The system of claim 18, wherein each plate of the plurality of plates includes a non-circular boundary portion configured to be recordable along with the wafer by the first interferometer and the second interferometer.

* * * * *